July 30, 1963   L. PÉRAS   3,099,491
SAFETY DEVICE FOR THE GUIDING WHEEL OF A VEHICLE
Filed June 1, 1956   2 Sheets-Sheet 1

July 30, 1963 L. PÉRAS 3,099,491
SAFETY DEVICE FOR THE GUIDING WHEEL OF A VEHICLE
Filed June 1, 1956 2 Sheets-Sheet 2

United States Patent Office 3,099,491
Patented July 30, 1963

3,099,491
SAFETY DEVICE FOR THE GUIDING WHEEL
OF A VEHICLE
Lucien Péras, Billancourt, France, assignor to Regie
Nationale des Usines Renault, Billancourt, France
Filed June 1, 1956, Ser. No. 588,740
Claims priority, application France June 10, 1955
4 Claims. (Cl. 301—126)

The invention relates to a safety device for the guiding wheel of a vehicle and more particularly for a lateral guiding wheel having a journal with a vertical axis, with particular application to the guiding of the wheels of rail vehicles, and enabling the wheel to be prevented from falling in the event of the journal breaking.

The invention consists essentially in the provision, through the hollow pivoting or fixed journal carrying the wheel, of a shaft having a lower disc forming an arresting device, carried by a support rigidly connected to the chassis of the vehicle, said disc receiving the wheel and preventing it from falling in the event of the journal breaking.

Figure 2:
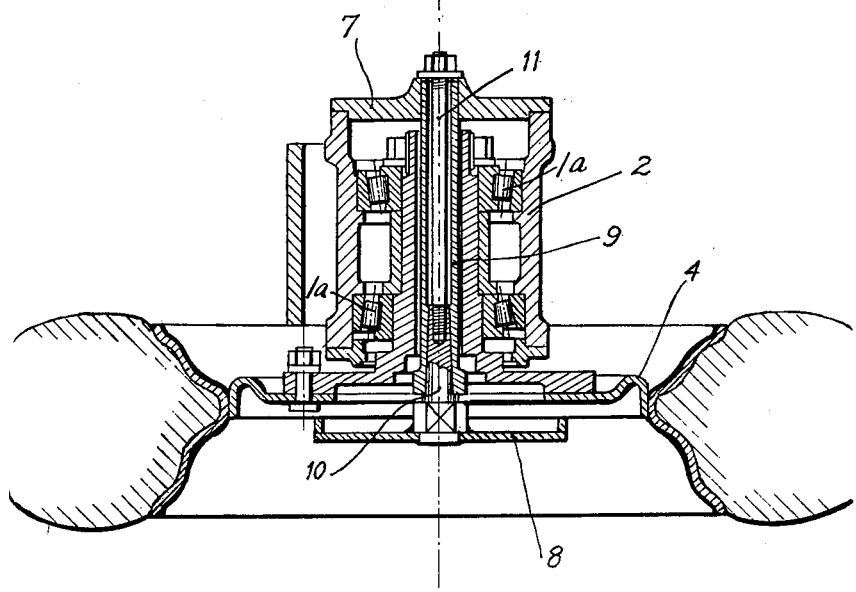
FIGURE 2 is a modification of the arrangement in FIGURE 1 and also has a rotatable journal.
Figure 4:
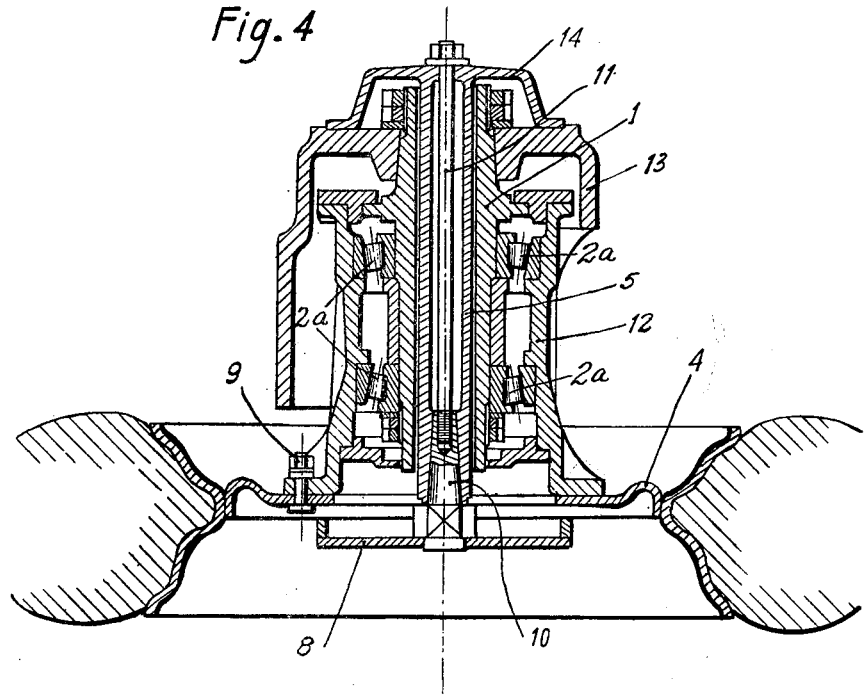
FIGURE 4 is a modification of the arrangement in FIGURE 3 and also has a fixed journal.

The embodiments in FIGURES 2 and 4 relate more particularly to devices adapted to prevent the detachment of the wheel if the fixing nuts should become unscrewed.

Figure 1:
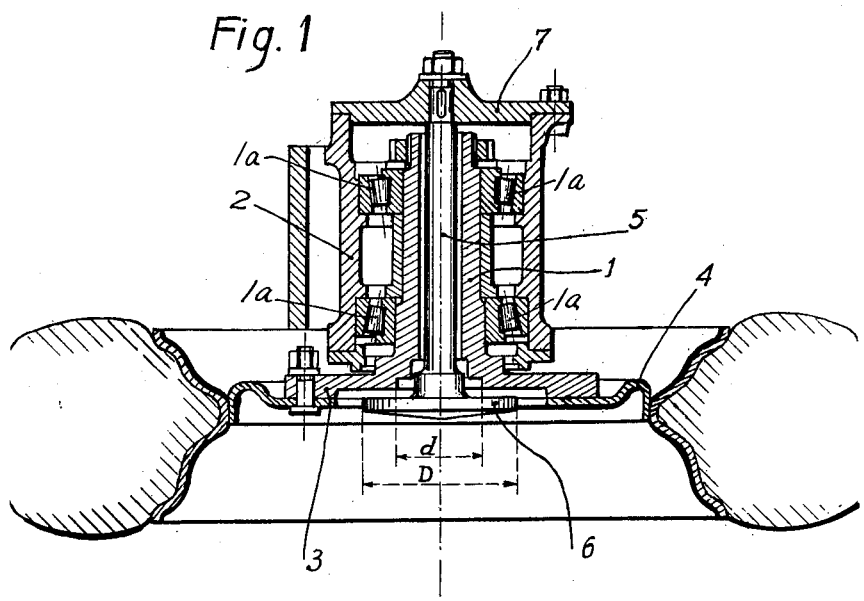
FIGURE 1 is a section on the axis of a rotatable journal.

Referring to FIGURE 1, it will be seen that the device comprises an axle 1 which can rotate with the wheel centered vertically in a support 2 which is fixed to the bogie, chassis or any other part of the vehicle, for example a railway vehicle. Between said axle 1 and the support 2 is mounted the necessary system of rolling bearings 1a, as can be seen in the drawing to permit free rotation of axle 1. The axle comprises a collar 3 forming a support for the wheel 4 and to which said wheel is secured.

The axle 1 has an internal bore to permit the passage of a shaft 5 carrying, at the bottom, a disc 6 intended to support the wheel in the event of breakage of the axle 1. This shaft 5 is fixed in a positive manner to the support 2 by means of the cover 7 for example. The outer diameter D of the disc 6 is greater than the minor diameter d of the axle supporting the wheel.

In the device in FIGURE 1, the safety feature comes into play only in the case of breakage of the axle. FIGURE 2 shows the same device in which the disc 6 of FIGURE 1 is replaced by the cup 8, the diameter of which is greater than that of the disc 6, to retain the wheel 4 in the event the wheel nuts come undone.

By way of non-limiting example, FIGURE 2 illustrates another possible mounting arrangement for a rotatable axle. Fixed in the member 7 of FIGURE 2 is a drilled shaft 9 having a tapered bore at the bottom.

This tapered bore receives the tapered stem 10 of the cup 8, the immobilization of the latter being obtained by the wedging of the engaged tapered portions and the portions of the stem 10 engaged with the member 9. A rod 11 rigidly connected to the stem 10 by screw threads, locks the assembly, by bearing against the member 7. In order to dismantle the wheel, the lock-nut is unscrewed from the rod 11, the stem 10 is disengaged and the rod 11 is unscrewed from the stem 10. The member 8 is free and permits dismounting of the wheel 4.

Figure 3:
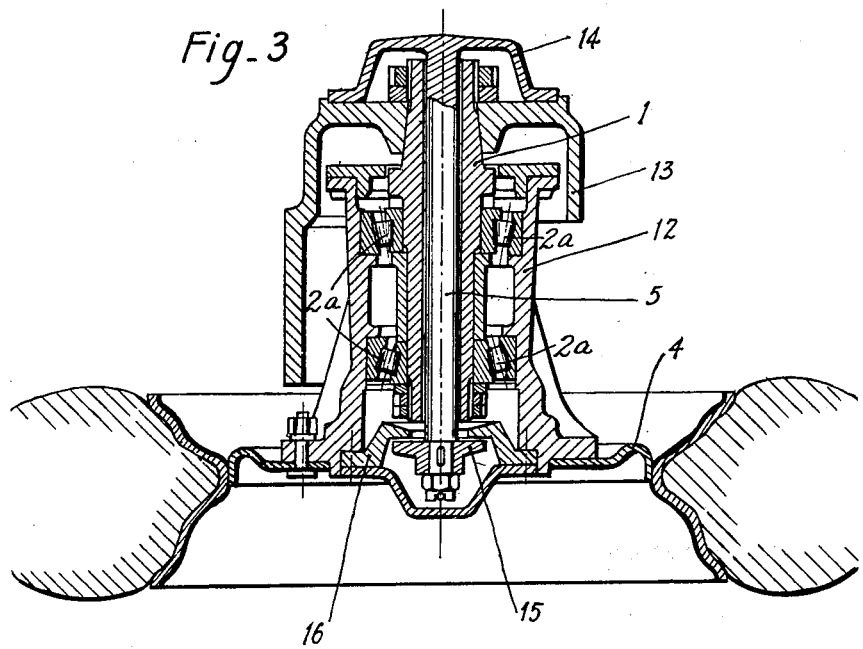
FIGURE 3 is a section of the same type of construction as in FIGURE 1, but having a fixed journal.

In the embodiment of FIGURE 3 which has a fixed journal, the axle 1 is a fixed hollow axle, on which is mounted, with the interposition of the necessary rolling bearings 2a, the hub 12 carrying the wheel 4. Shaft 5 is fixedly secured to support 13. Mounted inside the axle 1 is the shaft 5, fixed in a positive manner to the support 13 by means of a cup 14 rigidly connected to said support. At the bottom, said shaft 5 carries a disc 15 which serves as an arresting disc for the wheel-carrying hub in the event of breakage of the axle 1. It should be noted that the hub 12 bears on the disc, in the event of breakage of the axle, by means of an auxiliary collar 16 rigidly connected to said hub.

In the embodiment shown in FIGURE 3, the safety feature comes into play only in the case of breakage of the axle 1 in its housing in the member 13. In the embodiment shown in FIGURE 4, which has a fixed shaft 5, the member 15 of FIGURE 3 is replaced by the member 8, the diameter of which is greater than that of the member 15, to retain the wheel 4 in the event the nuts 9 come unscrewed. FIGURE 4 shows one of the possible mounting arrangements. The shaft 5 of FIGURE 3 is drilled out and comprises a tapered bore at the bottom. This tapered bore receives the stem 10 of the cup 8, the immobilization of said stem 10 being obtained by the wedging of the tapers of the stem 10 and the shaft 5 and by the flats on the stem 10 engaged with the hub of the cup 8. A rod 11 which screws into the stem 10 locks the assembly, bearing against the member 14. The dismounting of the wheel is effected in the same manner as in the previous case (FIGURE 2). It is understood that these embodiments are only given by way of non-limiting example, and that they may comprise any variants and modifications of details.

I claim:

1. In a lateral guiding wheel assembly for railway vehicles and the like having a hollow casing member having an upper end and a lower end and fixed to the frame of the vehicle, an axle disposed on a vertical axis and rotatably journalled in said member, said axle having a body portion formed with an axial bore, and a wheel rotatable in a horizontal plane connected to said axle, in combination, a safety device for preventing loss of the wheel upon breaking of the axle, said safety device comprising a rigid shaft unit secured at a first end to the upper end of said member and extending through said bore independently of said axle, and a supporting element supported from the other end of said shaft unit, said element having portions extending radially from said element beyond the periphery of said axial bore and thereby underlying the axle but being normally out of contact with said axle and with the wheel but being effective to support said axle and said wheel by engagement therewith upon breaking of said axle and dropping of said wheel into engagement with said supporting element, said safety device being free from supporting action with respect to said wheel during the normal operation of said wheel and being free from all forces acting upon and transmitted by said wheel.

2. In a lateral guiding wheel assembly for railway vehicles and the like having a hollow casing member having an upper end and a lower end and fixed to the frame of the vehicle, an axle disposed on a vertical axis and rotatably journalled in said member, said axle having a body portion formed with an axial bore, and a wheel rotatable in a horizontal plane connected to said axle, and a bearing support secured to the vehicle frame and rotatably carrying said axle, in combination, a safety device for preventing loss of the wheel upon breaking of the axle, said safety device comprising a rigid shaft unit secured at a first end to the upper end of said member and extending through said bore independently of said axle, and a supporting element supported from the other end of said shaft unit, said element having portions extending radially from said element beyond the periphery of said axial bore and thereby underlying the body portion of the axle but being normally out of contact with said axle and with the wheel but being effective to support said axle and said wheel by engagement therewith upon breaking of said axle and dropping of said wheel into engagement with said supporting element, said safety device being free from supporting action with respect to said wheel during the normal operation of said wheel and being free from all forces acting upon and transmitted by said wheel.

3. In a lateral guiding wheel assembly for railway vehicles and the like having a hollow casing member having an upper end and a lower end and fixed to the frame of the vehicle, an axle disposed on a vertical axis and rotatably journalled in said member, said axle being fixed to the vehicle guiding wheel and having a body portion formed with an axial bore, a hub rotatably mounted on said axle and a wheel rotatable in a horizontal plane connected to said hub, in combination, a safety device for preventing loss of the wheel upon breaking of the axle, said safety device comprising a rigid shaft unit secured at a first end to the upper end of said member and extending through said bore independently of said axle, and a supporting element supported from the other end of said shaft unit, said element having portions extending radially from said element beyond he periphery of said axial bore and thereby underlying the body portion of the axle but being normally out of contact with said axle and with the wheel but being effective to support said axle and said wheel by engagement therewith upon breaking of said axle and dropping of said wheel into engagement with said supporting element, said safety device being free from supporting action with respect to said wheel during the normal operation of said wheel and being free from all forces acting upon and transmitted by said wheel.

4. In a lateral guiding wheel assembly for railway vehicles and the like having a hollow casing member having an upper end and a lower end and fixed to the frame of the vehicle, an axle disposed on a vertical axis and rotatably journalled in said member, said axle having a body portion formed with an axial bore, and a wheel rotatable in a horizontal plane connected to said axle by a supporting web to which said wheel is secured, in combination, a safety device for preventing loss of the wheel upon breaking of the axle, said safety device comprising a rigid shaft unit secured at a first end to the upper end of said member and extending through said bore independently of said axle, and a supporting element carried at the other end of said shaft unit, said element having portions extending radially from said element beyond the periphery of said axial bore and thereby underlying the body portion of the axle and at least a portion of said web but being normally out of contact with said axle and with the web but being effective to support said axle and said wheel by engagement therewith upon dropping of said wheel into engagement with said supporting element, said supporting element including a tapered hub and said shaft unit including a hollow shaft element having a partially tapered bore for engagement with said last-named hub and a rod extending through said shaft element, said rod being secured to said last-named hub and supported from said member fixed to the vehicle frame, said safety device being free from supporting action with respect to said wheel during the normal operation of said wheel and being free from all forces acting upon and transmitted by said wheel.

References Cited in the file of this patent

UNITED STATES PATENTS

| | | |
|---|---|---|
| 1,475,745 | Bunger | Nov. 27, 1923 |
| 2,037,982 | Hughes | Apr. 21, 1936 |
| 2,468,386 | Walter | Apr. 26, 1949 |